United States Patent
Wenzel

(10) Patent No.: US 7,635,224 B2
(45) Date of Patent: Dec. 22, 2009

(54) METHOD OF ADJUSTING BACKLASH IN A DOWN HOLE BEARING ASSEMBLY

(75) Inventor: William R. Wenzel, Edmonton (CA)

(73) Assignee: Wenzel Downhole Tools, Ltd., Edmonton (CA)

( * ) Notice: Subject to any disclaimer, the term of this patent is extended or adjusted under 35 U.S.C. 154(b) by 320 days.

(21) Appl. No.: 11/525,192

(22) Filed: Sep. 20, 2006

(65) Prior Publication Data

US 2007/0071373 A1    Mar. 29, 2007

(30) Foreign Application Priority Data

Sep. 20, 2005    (CA) .................................. 2522434

(51) Int. Cl.
F16C 3/02    (2006.01)
E21B 4/02    (2006.01)
(52) U.S. Cl. .......................... 384/97; 384/304; 175/107
(58) Field of Classification Search ............ 384/92–94, 384/97, 303, 304, 424, 611, 613; 175/107
See application file for complete search history.

(56) References Cited

U.S. PATENT DOCUMENTS

| | | | | |
|---|---|---|---|---|
| 1,121,083 | A * | 12/1914 | Ferranti ...................... | 384/304 |
| 3,100,032 | A * | 8/1963 | Larsson ................... | 188/196 D |
| 4,114,704 | A * | 9/1978 | Maurer et al. ................ | 175/107 |
| 4,458,752 | A * | 7/1984 | Brandell ...................... | 166/187 |
| 4,856,914 | A * | 8/1989 | Sigg ............................. | 384/223 |
| 4,889,195 | A * | 12/1989 | Kruger et al. ................ | 175/107 |
| 5,195,754 | A * | 3/1993 | Dietle .......................... | 277/336 |
| 5,248,204 | A * | 9/1993 | Livingston et al. ............ | 384/97 |
| 5,385,407 | A * | 1/1995 | De Lucia ...................... | 384/97 |
| 5,480,233 | A * | 1/1996 | Cunningham ................ | 384/308 |
| 5,817,937 | A * | 10/1998 | Beshoory et al. ......... | 73/152.46 |
| 6,241,018 | B1 * | 6/2001 | Eriksen ....................... | 166/215 |
| 6,250,806 | B1 * | 6/2001 | Beshoory ...................... | 384/97 |
| 6,416,225 | B1 * | 7/2002 | Cioceanu et al. .............. | 384/97 |
| 6,561,290 | B2 * | 5/2003 | Blair et al. ................... | 175/107 |
| 6,640,909 | B2 * | 11/2003 | Vandenberg et al. .......... | 175/73 |
| 7,104,698 | B1 * | 9/2006 | Van Drentham-Susman ...................... | 384/611 |
| 7,309,163 | B2 * | 12/2007 | Dass ........................... | 384/97 |

FOREIGN PATENT DOCUMENTS

WO    WO 81/00736 A  *  3/1981

* cited by examiner

*Primary Examiner*—Marcus Charles
(74) *Attorney, Agent, or Firm*—Christensen O'Connor Johnson Kindness PLLC

(57) ABSTRACT

A method of adjusting backlash in a down hole bearing assembly involves providing in side by side relation on an outer surface of an inner mandrel a circumferential first threaded seat adapted to accommodate a first nut which engages the first threaded seat by rotation in a first rotational direction and becomes disengaged by rotation in a second rotational direction and a circumferential second threaded seat adapted to accommodate a second nut which engages the second threaded seat by rotation in the second rotational direction and becomes disengaged by rotation in the first rotational direction. The first nut is threaded onto the first threaded seat to place the inner mandrel in tension with a first stop and a second stop engaging a thrust bearing. The second nut is coupled to the first nut to resisting any rotational movement of the first nut in the second rotational direction.

7 Claims, 1 Drawing Sheet

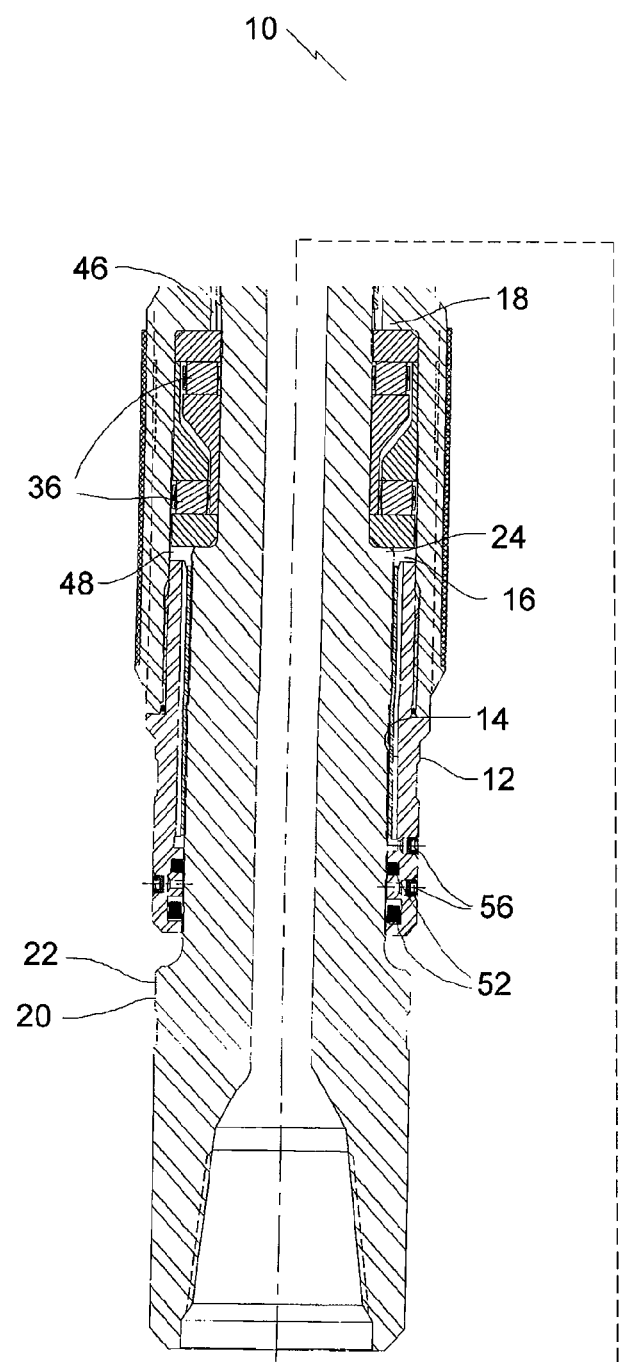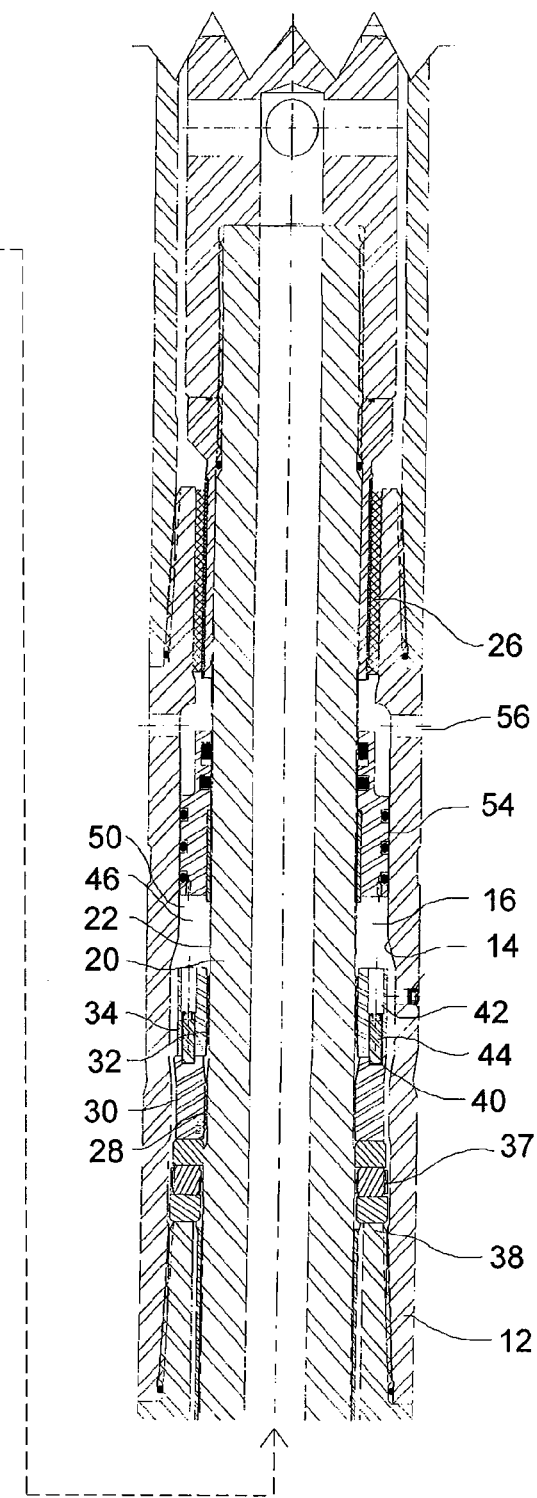
FIG. 1A
FIG. 1B

METHOD OF ADJUSTING BACKLASH IN A DOWN HOLE BEARING ASSEMBLY

FIELD OF THE INVENTION

The present invention relates to method of adjusting backlash in a down hole bearing assembly, and a down hole bearing assembly fabricated in accordance with the teachings of the method.

BACKGROUND OF THE INVENTION

A down hole bearing assembly is positioned between a down hole drilling motor and a drill bit. Should the drill bit become stuck, reactive torque or "backlash" results in the down hole bearing assembly being rotated in an opposite rotational direction to the normal application of torque by the down hole drilling motor. If backlash is not limited, the momentum of this reversed rotation can sever the mandrel of the down hole bearing assembly. A new down hole bearing assembly is manufactured to close tolerances, with a view to limiting backlash. As wear occurs, shims are inserted during servicing to take up slack and maintain backlash within acceptable limits.

SUMMARY OF THE INVENTION

According to the present invention there is provided a method of adjusting backlash in a down hole bearing assembly. A first step involves providing in side by side relation on an outer surface of an inner mandrel a circumferential first threaded seat adapted to accommodate a first nut which engages the first threaded seat by rotation in a first rotational direction and becomes disengaged by rotation in a second rotational direction and a circumferential second threaded seat adapted to accommodate a second nut which engages the second threaded seat by rotation in the second rotational direction and becomes disengaged by rotation in the first rotational direction. A second step involves positioning at least one thrust bearing between a first stop projecting from an inner surface of an outer housing and a second stop projecting from the outer surface of the inner mandrel. A third step involves threading the first nut onto the first threaded seat in the first rotational direction until further movement is resisted and the inner mandrel is placed in tension with the first stop and the second stop engaging the at least one thrust bearing. A fourth step involves threading the second nut onto the second threaded seat in the second rotational direction until the second nut engages the first nut. A fifth step involves coupling the first nut and the second nut. The second nut resists any rotational movement of the first nut in the second rotational direction and the first nut resists any rotational movement of the second nut in the first rotational direction.

BRIEF DESCRIPTION OF THE DRAWINGS

These and other features of the invention will become more apparent from the following description in which reference is made to the appended drawings, the drawings are for the purpose of illustration only and are not intended to in any way limit the scope of the invention to the particular embodiment or embodiments shown, wherein:

FIG. 1A is a side elevation view, in section, of a first part of a down hole bearing assembly constructed in accordance with the teachings of the present invention.

FIG. 1B is a side elevation view, in section, of a second part of a down hole bearing assembly constructed in accordance with the teachings of the present invention.

DETAILED DESCRIPTION OF THE PREFERRED EMBODIMENT

The preferred embodiment, a down hole bearing assembly generally identified by reference numeral 10, will now be described with reference to FIGS. 1A and 1B.

Structure and Relationship of Parts:

Referring to FIG. 1A, down hole bearing assembly 10 includes a tubular outer housing 12 that has an interior surface 14 defining an inner bore 16 with a first stop 18 projecting from interior surface 14. There is an inner mandrel 20 mounted for rotation within inner bore 16. Inner mandrel 20 has an outer surface 22 with a second stop 24 projecting from outer surface 22. Referring to FIG. 1B, radial bearings 26 are disposed between interior surface 14 of outer housing 12 and outer surface 22 of inner mandrel 20.

A circumferential first threaded seat 28 is adapted to accommodate a first nut 30 on outer surface 22 of inner mandrel 20 in side by side relation with a circumferential second threaded seat 32 that is adapted to accommodate a second nut 34. First nut 30 engages first threaded seat 28 by rotation in a first rotational direction and disengages by rotation in a second rotational direction, while second nut 34 engages second threaded seat 32 by rotation in the second rotational direction and disengages by rotation in the first rotational direction. For example, first nut 30 may have right-handed threads, and second nut 34 may have left-handed threads, or vice-versa. Means are provided to couple first nut 30 and second nut 34, such that second nut 34 resists any rotational movement of first nut 30 in the second rotational direction and first nut 30 resists any rotational movement of second nut 34 in the first rotational direction. An example of such means may be where first nut 30 has a threaded aperture 40, and second nut 34 has an opening 42 adapted to accommodate a screw fastener 44. Screw fastener 44 can then be extending through opening 42 in second nut 34 and engage threaded aperture 40 in first nut 30.

Referring to FIG. 1A, there are two on-bottom thrust bearings 36 positioned between first stop 18 and second stop 24, and, referring to FIG. 1A, an off-bottom thrust bearings 37 positioned between a third stop 38 projecting from interior surface 14 of outer housing 12 and first threaded seat 28. It will be understood that the number of bearings 36 and 38 will depend upon the circumstances of use. As first nut 30 is threaded on first threaded seat 28, off-bottom thrust bearings 37 are engaged between first nut 30 and third stop 38. Inner mandrel 20 is thus placed in tension, and, referring to FIG. 1A, first stop 18 and second stop 24 are brought into engagement with on-bottom thrust bearings 36. Referring to FIG. 1A and 1B, on-bottom thrust bearings 36 and off-bottom thrust bearings 37 are positioned in a bearing chamber 46 formed between interior surface 14 of outer housing 12 and outer surface 22 of inner mandrel 20. Bearing chamber 46 has a first end 48 and a second end 50, where first end 48 is sealed by at least one seal 52 and second end 50 is sealed by a pressure balancing piston 54. Ports 56 are used to inject lubrication fluid.

Operation:

Referring to FIG. 1B, first nut 30 is threaded onto first seat 28 in the first rotational direction until further movement is resisted and inner mandrel 20 is placed in tension with first stop shoulder 18 and second stop shoulder 24 engaging on-bottom thrust bearings 36 as shown in FIG. 1A and third stop shoulder 38 and first nut 30 engaging off-bottom thrust bearings 37 as shown in FIG. 1B. Second nut 34 is then threaded onto second threaded seat 32 in the second rotational direction until second nut 34 engages first nut 30. Finally, first nut

30 and second nut 34 are coupled by inserting screw fastener 44 through opening 42 in second nut 34 and into threaded aperture 40 of first nut 30. Second nut 34 resists any rotational movement of first nut 30 in the second rotational direction and first nut 30 resists any rotational movement of second nut 34 in the first rotational direction.

Advantages:

The threaded adjustment described above provides a number of advantages over the prior art:

1. Whereas with the prior art there was a necessity to manufacture the bearing assembly to close tolerances, the threaded adjustment provided by the first threaded seat and the first nut is very "forgiving". It allows the bearing assembly to be made to lower tolerances for less cost.
2. Whereas servicing adjustments with shims used in the prior art was a "finicky" procedure that required care and attention from the technician, the threaded adjustment is rapid and comparatively "idiot proof".
3. Whereas in the prior art shims could become dislodged and the backlash adjustment change during use, the use of the second nut coupled to the first nut ensures that the backlash setting will be maintained after the down hole bearing assembly has left the shop.

In this patent document, the word "comprising" is used in its non-limiting sense to mean that items following the word are included, but items not specifically mentioned are not excluded. A reference to an element by the indefinite article "a" does not exclude the possibility that more than one of the element is present, unless the context clearly requires that there be one and only one of the elements.

It will be apparent to one skilled in the art that modifications may be made to the illustrated embodiment without departing from the spirit and scope of the invention as hereinafter defined in the Claims.

What is claimed is:

1. A method of adjusting backlash in a down hole bearing assembly, comprising the steps of:
   providing in side by side relation on an outer surface of an inner mandrel a circumferential first threaded seat adapted to accommodate a first nut which engages the first threaded seat and a circumferential second threaded seat adapted to accommodate a second nut which engages the second threaded seat;
   positioning at least one thrust bearing between a first stop projecting from an interior surface of an outer housing and a second stop projecting from the outer surface of the inner mandrel;
   threading the first nut onto the first threaded seat until further movement is resisted and the inner mandrel is placed in tension with the first stop and the second stop engaging the at least one thrust bearing;
   threading the second nut onto the second threaded seat until the second nut engages the first nut; and
   coupling the first nut and the second nut, such that the second nut resists any rotational movement of the first nut and the first nut resists any rotational movement of the second nut.

2. A method of adjusting backlash in a down hole bearing assembly, comprising the steps of:
   providing in side by side relation on an outer surface of an inner mandrel a circumferential first threaded seat adapted to accommodate a first nut which engages the first threaded seat and a circumferential second threaded seat adapted to accommodate a second nut which engages the second threaded seat;
   positioning at least one on-bottom thrust bearing between a first stop shoulder projecting from an interior surface of an outer housing and a second stop shoulder projecting from the outer surface of the inner mandrel;
   positioning at least one off bottom thrust bearing between a third stop shoulder projecting from the interior surface of the outer housing and the first threaded seat;
   threading the first nut onto the first seat until further movement is resisted and the inner mandrel is placed in tension with the first stop shoulder and the second stop shoulder engaging the at least one on-bottom thrust bearing and the third stop shoulder and the first nut engaging the at least one off bottom thrust bearing;
   threading the second nut onto the second threaded seat until the second nut engages the first nut; and
   coupling the first nut and the second nut, such that the second nut resists any rotational movement of the first nut and the first nut resists any rotational movement of the second nut.

3. The method as defined in claim 2, the step of coupling the first nut and the second nut involving extending a screw fastener through an opening in the second nut and engaging a threaded aperture in the first nut.

4. A down hole bearing assembly, comprising:
   a tubular outer housing having an interior surface defining an inner bore with a first stop projecting from the interior surface;
   an inner mandrel mounted for rotation within the inner bore, the inner mandrel having an outer surface with a second stop projecting from the outer surface;
   radial bearings disposed between the interior surface of the outer housing and the outer surface of the inner mandrel;
   a circumferential first threaded seat adapted to accommodate a first nut on the outer surface of the inner mandrel in side by side relation with a circumferential second threaded seat adapted to accommodate a second nut, the first nut engaging the first threaded seat, the second nut engaging the second threaded seat and the first nut;
   at least one thrust bearing positioned between the first stop and the second stop, the first nut being used to place the inner mandrel in tension and bring the first stop and the second stop into engagement with the at least one thrust bearing;
   means for coupling the first nut and the second nut, such that the second nut resists any rotational movement of the first nut and the first nut resists any rotational movement of the second nut.

5. A down hole bearing assembly, comprising:
   a tubular outer housing having an interior surface defining an inner bore with a first stop projecting from the interior surface;
   an inner mandrel mounted for rotation within the inner bore, the inner mandrel having an outer surface with a second stop projecting from the outer surface;
   radial bearings disposed between the interior surface of the outer housing and the outer surface of the inner mandrel;
   a circumferential first threaded seat adapted to accommodate a first nut on the outer surface of the inner mandrel in side by side relation with a circumferential second threaded seat adapted to accommodate a second nut, the first nut engaging the first threaded seat, the second nut engaging the second threaded seat and the first nut;
   at least one on-bottom thrust bearing positioned between the first stop and the second stop;
   at least one off-bottom thrust bearing positioned between a third stop projecting from the interior surface of the outer housing and the first threaded seat, such that as the first nut is threaded on the first threaded seat, the at least one off-bottom thrust bearing is engaged between the first nut and the third stop, the inner mandrel is placed in tension and the first stop and the second stop are brought into engagement with the at least one on-bottom thrust bearing;

means for coupling the first nut and the second nut, such that the second nut resists any rotational movement of the first nut and the first nut resists any rotational movement of the second nut.

6. The down hole bearing assembly as defined in claim 5, wherein the first nut having a threaded aperture, the second nut having an opening adapted to accommodate a screw fastener, a screw fastener extending through the opening in the second nut and engaging the threaded aperture in the first nut.

7. The down hole bearing assembly as defined in claim 5, wherein the at least one on-bottom thrust bearing and the at least one off-bottom thrust bearing are positioned in a bearing chamber formed between the interior surface of the outer housing and the outer surface of the inner mandrel, the bearing chamber having a first end and a second end, the first end being sealed by at least one seal and the second end being sealed by a pressure balancing piston.

* * * * *